United States Patent [19]

Hope

[11] Patent Number: 4,635,478
[45] Date of Patent: Jan. 13, 1987

[54] DEVICE FOR REGISTRATION OF LEVEL, TRANSITION ZONES AND TEMPERATURE

[75] Inventor: Bjorn R. Hope, Lommedalen, Norway

[73] Assignee: Tanksystem A/S, Lysaker, Norway

[21] Appl. No.: 616,830

[22] PCT Filed: Sep. 16, 1983

[86] PCT No.: PCT/NO83/00034
§ 371 Date: May 17, 1984
§ 102(e) Date: May 17, 1984

[87] PCT Pub. No.: WO84/01216
PCT Pub. Date: Mar. 29, 1984

[30] Foreign Application Priority Data

Sep. 17, 1982 [NO] Norway ................................. 823167

[51] Int. Cl.[4] ............................................. G01F 23/04
[52] U.S. Cl. ..................................... 73/292; 33/126.5; 137/558; 374/142
[58] Field of Search .......................... 73/291, 292, 321; 33/126.7 R, 125 T, 126.5, 126.6, 126; 374/142, 170, 184

[56] References Cited

U.S. PATENT DOCUMENTS

| 812,269 | 2/1906 | Horton | 33/126 |
| 2,284,396 | 5/1942 | Pfeiffer | 33/126.7 R |
| 3,098,914 | 7/1963 | Giannino | 33/126.7 R X |
| 3,500,546 | 3/1970 | Pilcher | 73/321 X |
| 4,226,023 | 10/1980 | Gravert | 33/126.5 |
| 4,255,859 | 3/1981 | Klieman | 73/321 X |

FOREIGN PATENT DOCUMENTS 2743862  3/1978  Fed. Rep. of Germany ..... 33/126.5

Primary Examiner—Daniel M. Yasich
Attorney, Agent, or Firm—Morgan & Finnegan

[57] ABSTRACT

A manually operable measurement apparatus for measuring level, temperature and transition zone between two different liquids. The measurement is carried out by letting a probe through a sluice and valve means into a tank. The probe is combined in one unit and is sensitive to both relative dielectric constant and loss factor as well as the temperature of the surrounding medium(s) to be measured. The invention is particularly suitable for measurement in tanks having an internal pressure being different from the atmospheric pressure and in explosive environments.

13 Claims, 12 Drawing Figures

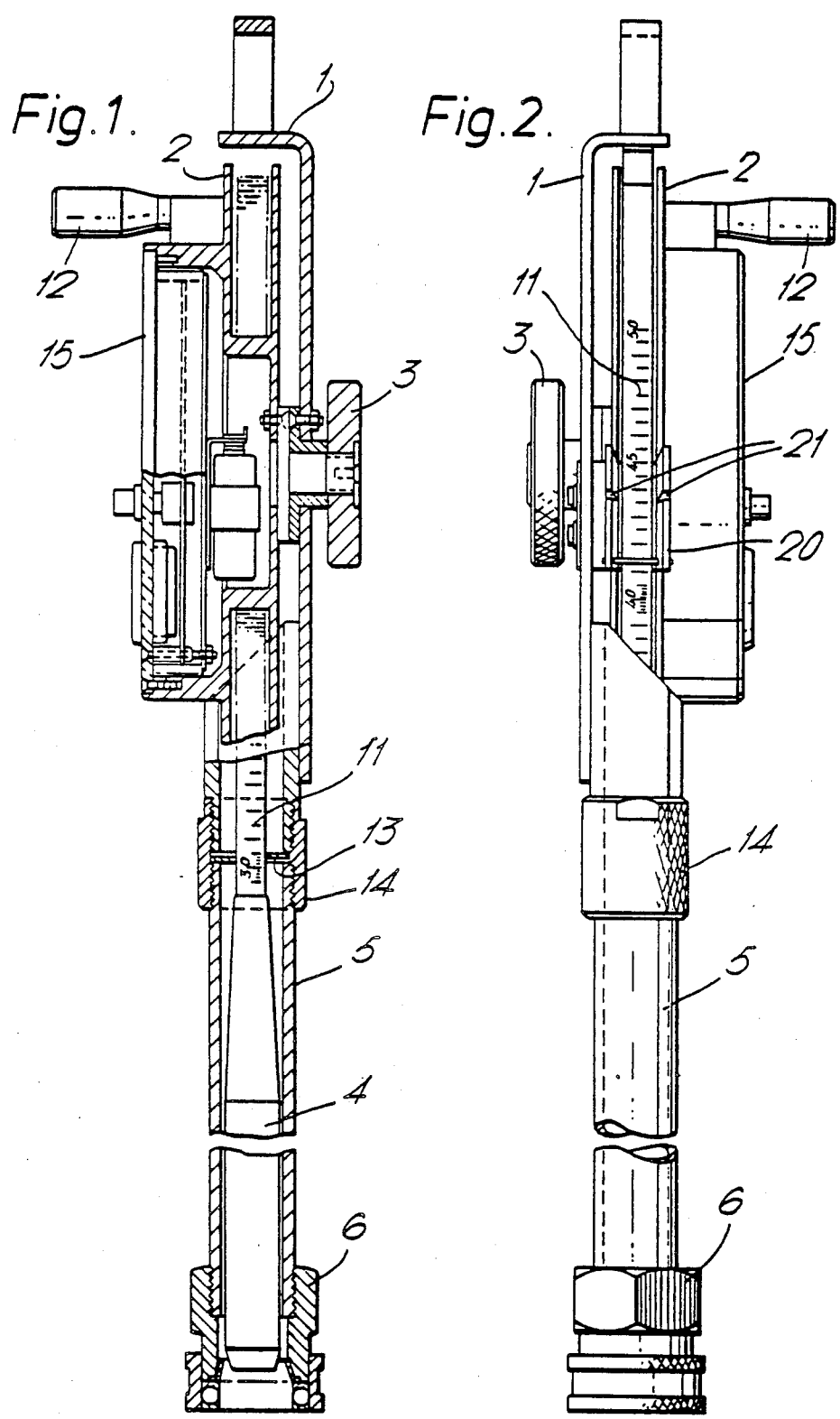

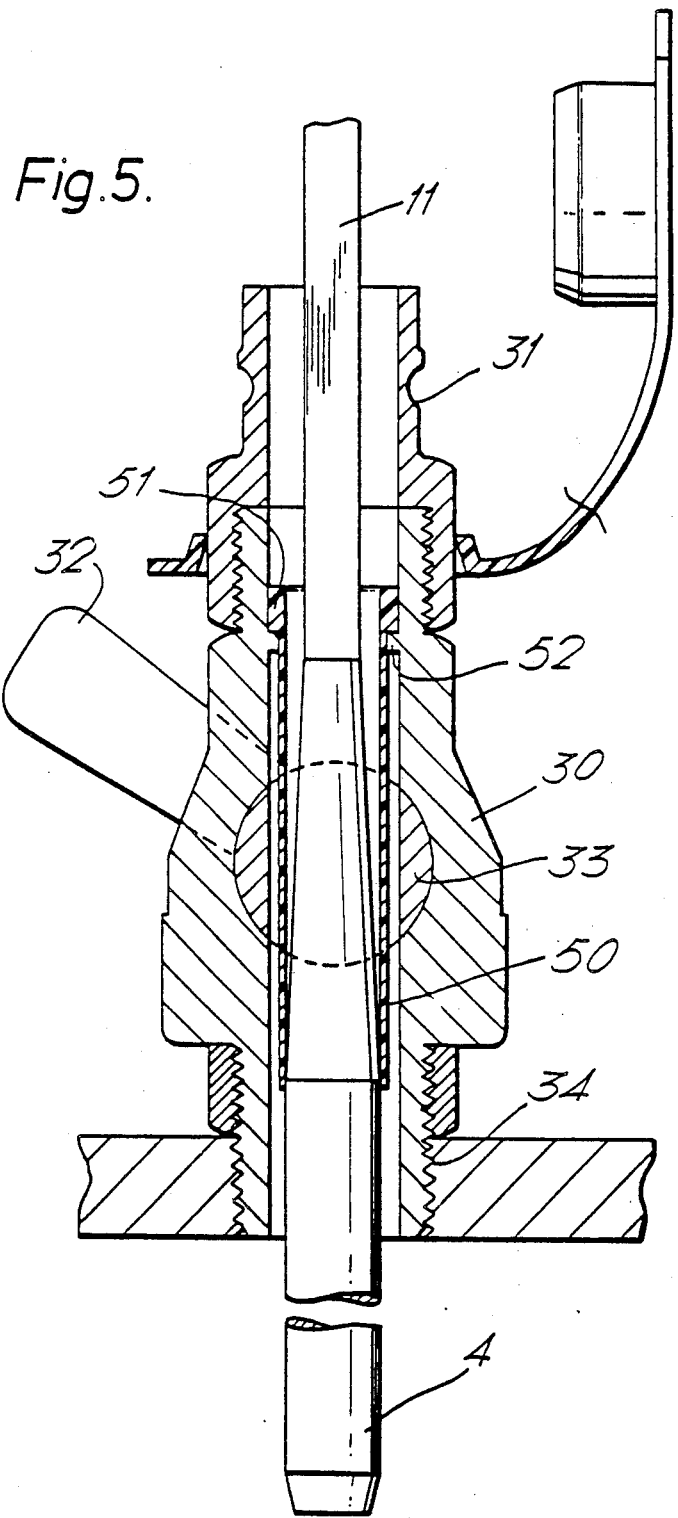

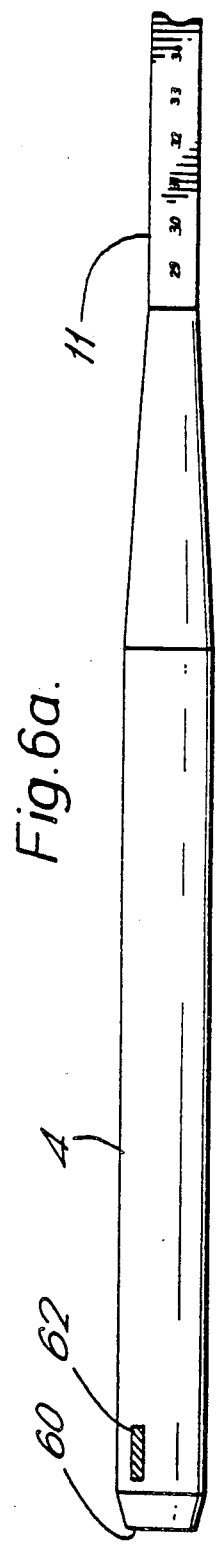
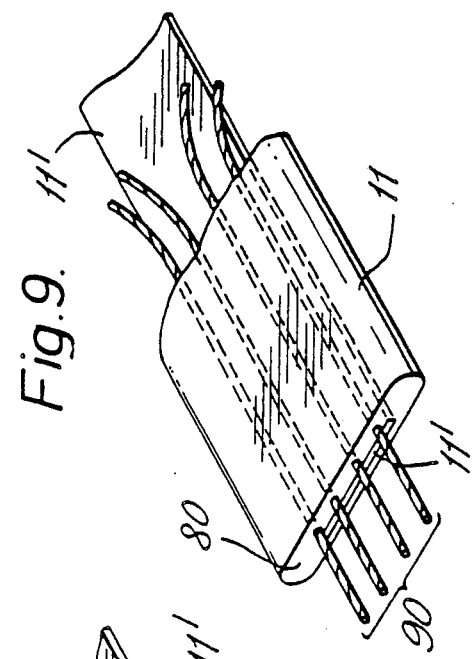
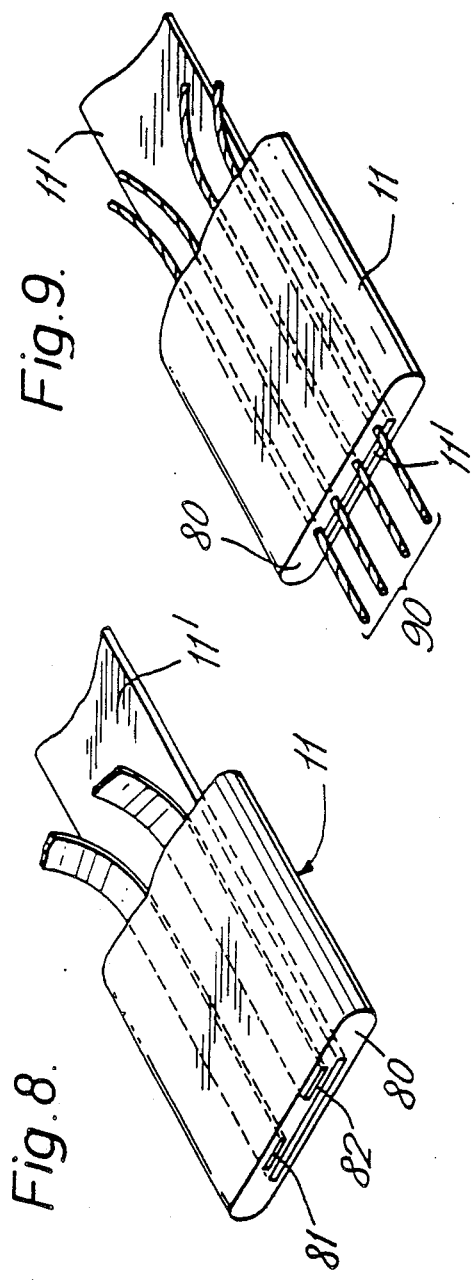

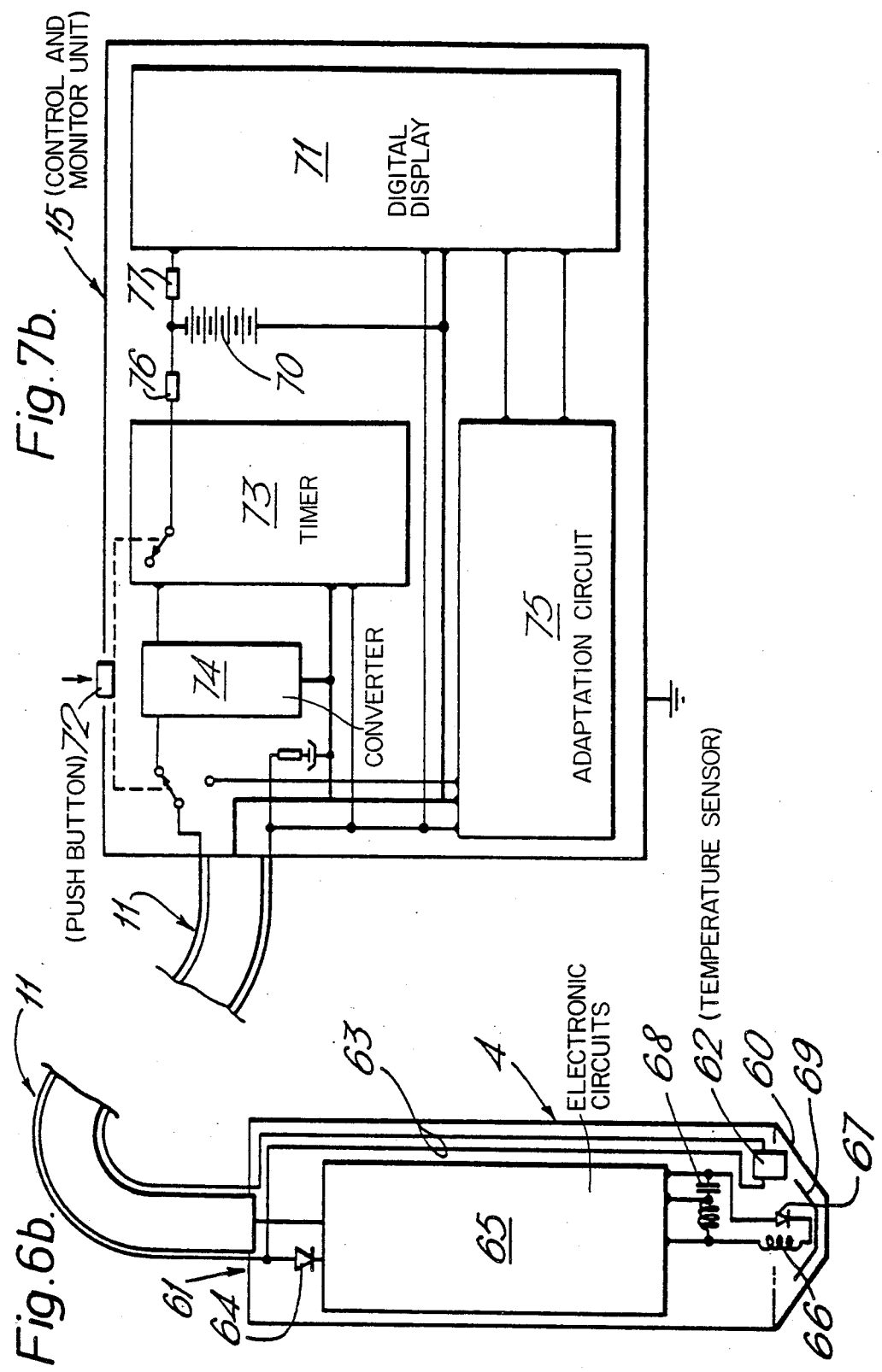

DEVICE FOR REGISTRATION OF LEVEL, TRANSITION ZONES AND TEMPERATURE

The present invention relates to a device for measuring, by means of a manually operable portable measuring apparatus, the physical properties of the contents of the tank, said device including a probe being sensitive to the medium to be measured, said probe being connected to a reel means through a tape measure having means for positional read-off.

It is previously known devices where a measuring probe is lowered into a container in order to detect liquid surface by letting a slit between two acoustic transducers or a transmitter and a receiver be filled with liquid. Such a device is only capable of detecting whether there is liquid present or not. Such a slit has in addition the property of being easily clogged by the medium to be measured in case it is of high viscosity type.

The present invention is therefore intended to record the transition between liquid and gas, and/or the transition layer between two liquids or other medium to be measured.

It is also intended to let the temperature at the location of measurement be measured by having a combination probe.

The present invention to be described further solves the problem of detection of level and transition layers by providing high accuracy, independently of the nature of the medium to be measured. Simultaneously, the effect of hysteresis is minor, and there are no cleaning problems, in addition to the fact that three properties may be measured by one single probe. Further, the probe is capable of being adjusted such that it may record an interface between two media without the body of the probe touching said interface.

The device consists of a manually operable apparatus having a reel upon which is wound a graded tape measure having integrally connected therewith electrical conductors. The combination probe is attached to the free end of the tape measure, said probe being capable of registering a sharp and well-defined interface between gas and liquid as well as a mixed transition layer between two liquids by means of a sensing device responsive to the electrical properties of the ambient measuring medium, in particular dielectric constant and loss factor. The temperature is recorded by means of a temperature sensitive current generator or modifier. An indication of the probe reaching the liquid surface or possibly the mixed transition layer between two liquids, appears either as an acoustic signal from an audio signal transmitter arranged at the center of the said reel means or as change in current being registered on a suitable indicator. The temperature may be read off on a display together with or combined with the means for reading off the other parameters arranged at the center of said reel. The actual position of the tip of the probe may be read off on the tape measure by means of a suitable indicator.

The present device is particularly suitable in cases where the medium to be measured is of such nature that the probe is not capable of penetrating into the medium. This may be the case with high-viscosity liquids, particles or medium being of such a nature that it is not of advantage to have contact between the probe and the medium to be measured, or that the medium is of such a nature that a change in dielectric constant or loss factor is the most suitable or the only method for recording a transition layer.

The invention is now to be further described with reference to the enclosed drawings wherein FIG. 1 shows a section through the manually operable apparatus according to the invention, FIG. 2 shows a front view of the manually operable apparatus of FIG. 1, FIG. 3 is a valve device adapted to cooperate with the sluice of the manually operable apparatus illustrated in FIGS. 1 and 2;

FIG. 5 is a view in cross section illustrating in detail the sluice/valve element of the embodiment of the inventive apparatus shown in FIG. 3;

FIG. 6a shows the relationship of the probe and tape measure in the apparatus of this invention;

FIG. 6b shows in detailed block diagrammatic form the electronic circuitry of the probe;

Figure 7A:
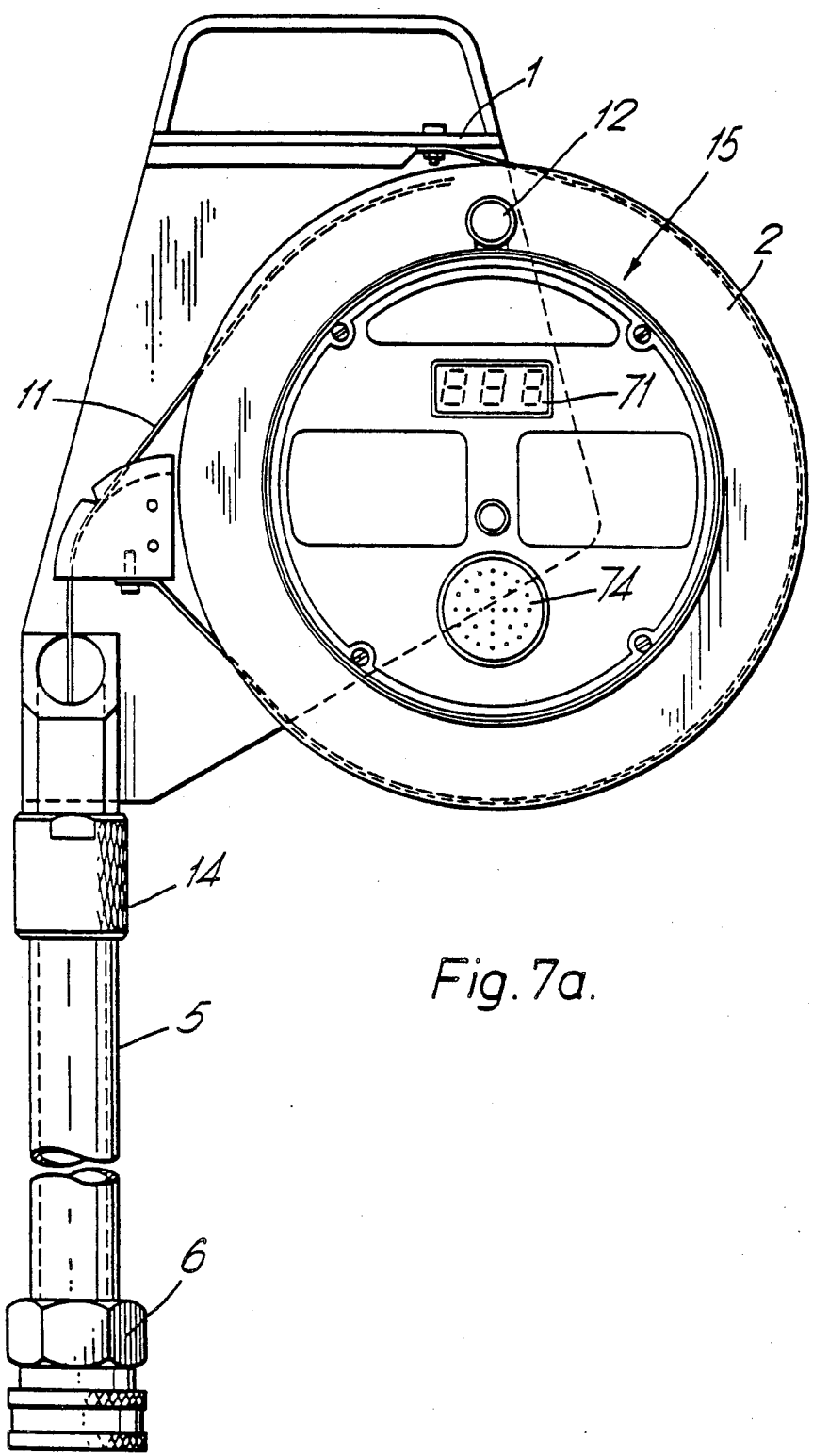
FIG. 7a is a lateral view in elevation of the control and monitoring element of the apparatus of this invention.
Figure 7C:
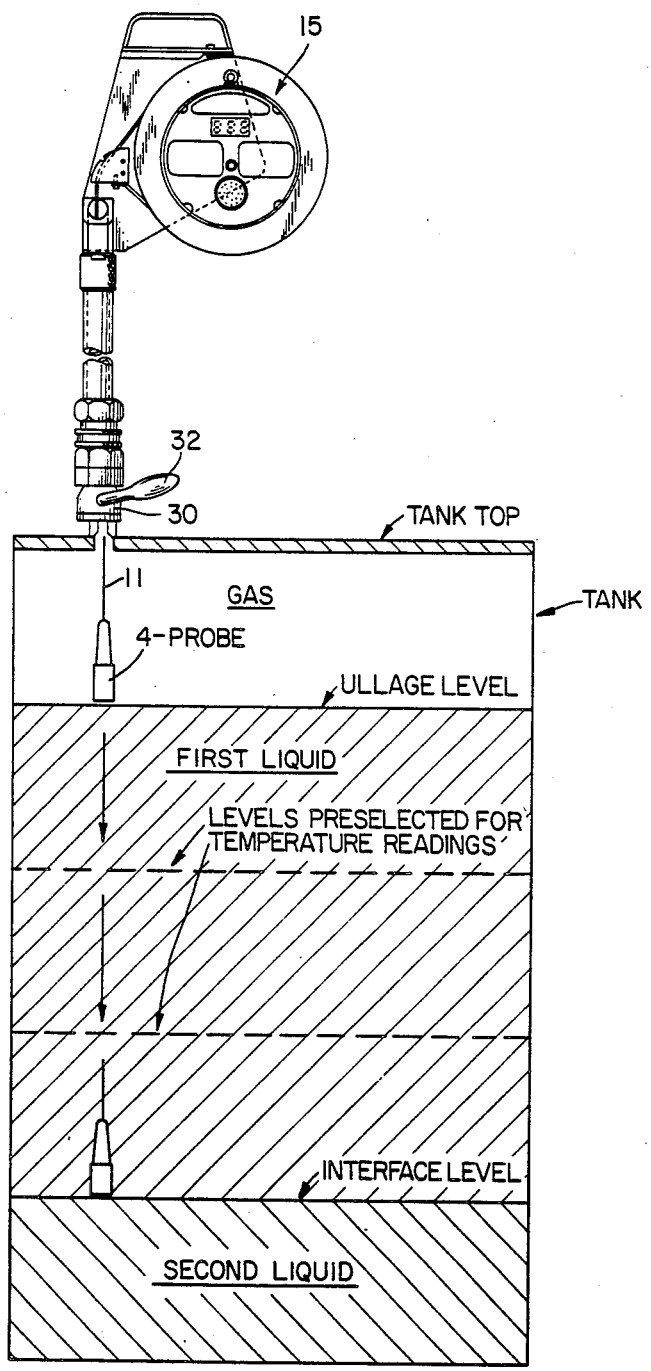

FIG. 7b shows in detailed block diagrammatic form the electronic circuitry of the control and monitoring element illustrated in FIG. 7a; and FIG. 7c shows schematically a tank, tank top, ullage level, first and second liquid levels, levels preselected for temperature readings, an interface level between the liquids, a gas level and a probe in accordance with the invention inserted in the tank; and FIG. 7c shows the probe measuring the physical properties of the two liquids.

FIGS. 8 and 9 illustrate two alternative embodiments of the tape measure employed in the inventive apparatus, including illustrations of the conductor cables integrated therein.

As clearly illustrated in FIG. 1 as well as in FIG. 6a, the diameter of the probe is quite small compared to the size of the tank, suitably being 1-inch (25 mm) which enables measurements to be made in tanks and containers having a pressure different from the atmospheric by letting the probe be introduced through a sluice means.

The manually operable device is illustrated in FIG. 1. The reel 2 is pivotably connected to a holder 1 on support. A lock means 3 serves to lock the reel 2 in any position and thereby prevents the measurement probe 4 from dropping in an uncontrolled manner from the sluice 5. The sluice is connected to the top of a valve means 30 (see FIG. 3) by means of a quick-coupling 6. A combined scrape-off, sealing and electric drain device 13 is mounted between said sluice 5 and the holder 1, and being disconnectable by means of a coupling 14 for replacement or cleaning. The scrape-off device 13 is capable of draining off possible electrostatic charges which may have been created in connection with the unwinding of the tape measure. The tape measure 11 is wound on the reel 2. Winding and unwinding of the tape measure is carried out by means of turning the handle 12 fixed to reel 2. A monitoring unit 15 having a battery means and the required electronics is mounted at the centre of the reel 2 with an electrical connection to the tape measure 11 which itself is fixed to the reel 2 and also has a connection to ground.

In FIG. 2 the device is shown in frontal view having the tape measure 11 running across a guide means 20 which is provided with alignment marks 21 to indicate the exact position of the combination probe relative to a reference point of the tank.

Figure 3:
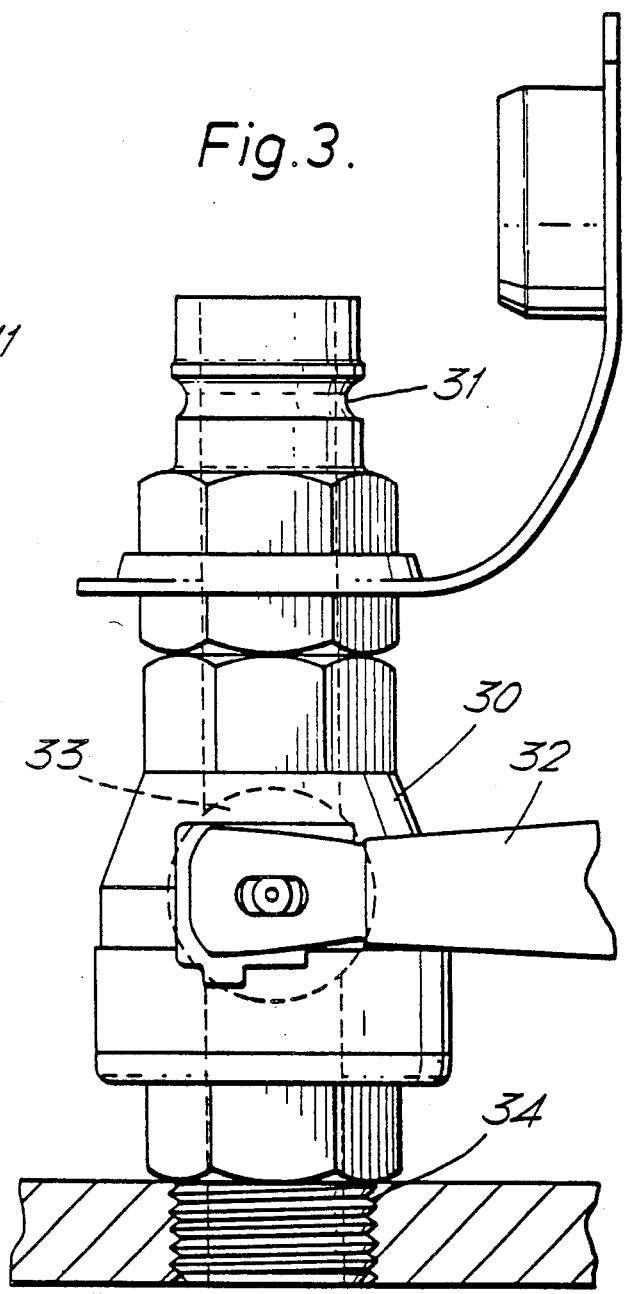

FIG. 3 illustrates the valve means 30 with its connector 31. A valve handle 32 opens and closes the passage through the valve means by means of the ball 33. The complete valve means is connected to the tank by means of a threaded portion 34.

Figure 4:
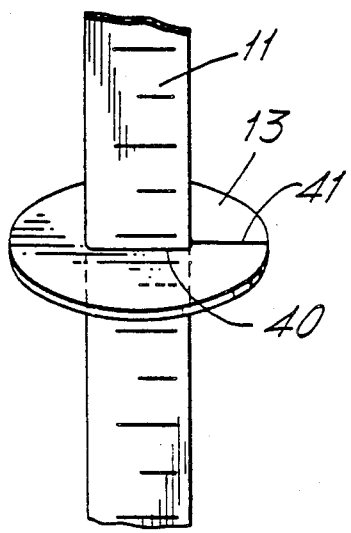
FIG. 4 shows a scrape-off means which cooperates with tape measure and is capable of draining off possible electrostatic charges created in connection with unwinding of the tape.

FIG. 4 illustrates in further details the scrape-off device 13 having a guide hole 40, the circumference of which encompasses the tape measure 11, a slit 41 being provided for lateral introduction of the tape. The scrape-off device 13 may be arranged at the upper end of the sluice 5 for said probe. It may consist of a piece of elastic plastic material to which has been added sufficient conductive material so as to obtain a close fit against the tape measure as well as a sufficient conductivity. As indicated in FIG. 4, the scrape-off device 13 may be composed of one or two parts.

When introducing the probe 4 from the sluice through the ball valve means 30 into the tank, it may be advantageous to provide a guide sleeve 50. The said sleeve 50 is retained at the upper portion of the sluice 5 by resting on the probe 4. When the probe 4 is dropped through the valve 30, the sleeve 50 follows in order to prevent the valve ball 33 from damaging the tape measure 11. The sleeve 50 is provided with a collar 51 which comes to rest against a stop means 52 at the lower-most position thereof, as clearly indicated in FIG. 5. In certain circumstances, the sleeve may, in addition to serve as guidance for the tape measure, be provided with drain-off electrodes for possible electrostatic charges. Thus the said sleeve will upon introduction into the housing of the valve means 30 provide both a guidance for the tape measure as well as protection against wear thereof due to sharp edges within the valve housing. Further, as will clearly appear from FIG. 5, the protective sleeve 50 also safeguards against any damage or accidental cutting-off in connection with closing of the ball valve before the probe is completely withdrawn into the sluice.

In FIGS. 6a and b there is illustrated a combination measurement probe 4 being surrounded by an acid-proof steel tube, the interior of which is filled with an insulating material in order to stabilize and protect electronic components (65 therein), the tip 60 of the probe being made from an insulating material and forming the sensitive end reacting to changes in dielectric constant and the loss factor of the medium. At its upper end 61, the probe 4 is connected to the tape measure 11 both in a mechanical and electrical fashion. The sensitive end of the probe 4 can be made from a non-conductive plastic material in which the capacitive sensor part 69 has been embedded. As indicated in FIG. 6b, it consists primarily of a shallow truncated conical surface which together with the coil 66 of the sensitive end form a resonance circuit to which an alternating voltage is applied from the electronic circuit 65. The degree of resonance and possible attenuation brought about by the dielectric loss factor of the medium to be measured has an effect on the amplitude of the resonance circuit voltage being detected by the diode 67, which in turn charges a capacitor 68. The value of the D.C. voltage of the capacitor 68 determines the characteristics of pulse modulated signal which is superimposed by the electronic circuit 65 on the supplied power supply current and detected by the monitoring part at the centre of the reel after transfer via the conductors of the tape measure 11. Both the energy supply as well as the transfer of the measurement signal may take place through three conductors. A temperature sensitive device 62 may be arranged close to the capacitive sensor part 69 and function as a current generator or modifier where the current is proportional to the temperature in degrees Kelvin. Its current path is through the conductors 63 and it is separated from the capacitance and capacitive sensor part 69 by means of a diode 64.

FIGS. 7a and 7b illustrate both in elevation and in schematic form the control- and monitor part 15 having a battery 70 and a digital display 71 which in the example in FIG. 7a displays the temperature of the medium which is sensed. The current generated in the temperature sensor 62 is a function of the temperature in degrees Kelvin surrounding the sensor, and is by means of an adaptation circuit 75 transformed into a degree definition on the said display 71. The resistors 76 and 77 serve as current limiters in connection with use in surroundings where the risk of explosion is high. A timer 73 is started by means of push-button 72 for a specific period of time whereby power supply to the measurement probe takes place via the conductors of the tape measure 11. The measurement signal from the ullage/interface sensor electronic circuit 65 is transferred as short pulses superimposed upon the power supply current, and is decoded and converted into acoustic signals in a converter 74.

FIG. 8 illustrates the tape measure 11 which is made with an insulation mantle 80, surrounding a steel tape measure 11' being graded into suitable measurement units, and with the largest measurement unit repeated often enough that in any position for the operation of the tape measure, it is possible to read off both the largest unit, for instance meters (SI-limit) as well as centimeters and millimeters, within a distance on the tape measure of 5-10 cm. The steel tape 11' also functions to form an earth connection connecting the combination sensor galvanically to the earth reference of the tank and to compensate for strain. Two or more electrical conductors or cables 81, 82 may be integrated in the tape measure 11 and be independently insulated. The said conductors may have a rectangular cross-section as indicated in FIG. 8, e.g. in the form of longitudinal foils with sufficient distance from the marginal edge of the steel tape 11' to prevent the conductors from being exposed to the environment due to mechanical wear or other form of damage on the edges of the tape measure 11.

As illustrated in FIG. 9, the tape measure 11 may be provided with conductors 90 of circular cross-section, the number of conductors being four in the non-limitative example.

I claim:

1. Manually operable, portable measuring apparatus for measuring the dielectric constant and loss factor as well as temperature of media contained in a tank to determine the ullage level and the interface level between at least two liquids, said apparatus comprising a combination probe sensitive to the media to be measured, said probe being connected to a tape measure provided with positional read-off indicators and which is supported on a reel, sensing means in the form of a capacitance sensing means and temperature sensing means contained in said probe in approximately the same region of said probe to detect said ullage level and the said interface between at least two liquids of said media by measuring dielectric constant and loss factor as well as the temperature thereof, said sensing means being physically isolated from said media by an electrical insulating material, said tape measure connecting said probe mechanically to said reel, said reel having attached thereto a monitoring unit including electronic signal processing means and electrical conductors attached thereto and extending therefrom through said tape measure to said sensing means in said probe, an insulating mantle covering said tape measure and said conductors therein, said apparatus including a sluice connected to the reel and provided with a quick-coupling in the lower end thereof which is adapted to cooperate with a tank having a pressure different from atmospheric pressure and provided with a ball valve attached to the top portion thereof, and the probe and tape measure are guided internally through said sluice so that the probe may enter said tank by way of said quick coupling and said ball valve, and a combined scrape-off and gas sealing device located in the upper end of said sluice.

2. Manually operable, portable measuring apparatus as defined in claim 1 wherein the combined scrape-off and gas sealing device is made of electrically conductive material to drain off electrostatic charges from the tape measure.

3. Manually operable, portable measuring apparatus as defined in claim 1 including a guide sleeve being adapted to move into the ball valve on the tank, following the probe thereinto and providing protective guidance to the tape measure and preventing damage thereto when said tape measure is in said ball valve, said guide sleeve being capable of locking said ball valve in its open position.

4. Manually operable, portable measuring apparatus as defined in claim 3 in which the probe is dimensioned to be feedable through a 1 inch valve disposed on a tank containing the media.

5. Manually operable, portable measuring apparatus as defined in claim 3, in which the tape measure has embedded therein a steel tape having conductors located laterally inwardly of the longitudinal edges of said tape.

6. Manually operable, portable measuring apparatus as defined in claim 1 in which the probe is dimensioned to be feedable through a 1 (one) inch valve disposed on a tank containing the media.

7. Manually operable, portable measuring apparatus as defined in claim 1, in which the tape measure has embedded therein a steel tape having conductors being located inwardly of the longitudinal edges of said tape.

8. Manually operable, portable measuring apparatus for measuring the dielectric constant and loss factor, as well as temperature of media contained in a tank to determine the ullage level and the interface level between at least two liquids, said apparatus comprising a combination probe which is sensitive to the media to be measured, said probe being connected to a tape measure provided with positional read-off indicators and which is supported on a reel, sensing means in the form of a capacitance sensing means and a temperature sensing means contained in said probe in approximately the same region of said probe to detect said ullage level and said interface of said media by measuring the dielectric constant and loss factor, as well as the temperature thereat, said sensing means being physically isolated from said media by an electrical insulating material, said tape measure connecting said probe mechanically and electrically to said reel, said reel having a monitoring unit including electronic signal processing circuitry and electrical conductors attached thereto and extending therefrom through said tape measure to said sensing means in said probe, said capacitance sensing means including electronic circuit means for providing to said electrical conductors a signal characteristic of the detected capacitance, and said temperature sensing means functioning as a current generator to feed said electrical conductors.

9. Manually operable, portable measuring apparatus as defined in claim 8, in which capacitance sensing electrodes of the capacitance means are located in a lower, tapered end of the probe.

10. Manually operable, portable measuring apparatus as defined in claim 9, in which the lower, tapered end of the probe is substantially in the form of a truncated cone.

11. Manually operable, portable measuring apparatus as defined in claim 8, in which the tape measure has embedded therein a steel tape having conductors located laterally inwardly of the longitudinal edges of said tape.

12. Manually operable, portable measuring apparatus as defined in claim 8, in which the probe is dimensioned to be feedable through a 1 (one) inch valve disposed on a tank containing the media.

13. Manually operable, portable measuring apparatus as defined in claim 8, including converter means for converting a signal from the probe into an audio-acoustical signal due to the changes of dielectric constant of the measured medium relative to the surrounding media, said signal indicating the reading at various levels of said medium.

* * * * *